United States Patent
Huang et al.

(10) Patent No.: US 6,803,796 B2
(45) Date of Patent: Oct. 12, 2004

(54) BI-DIRECTION SWITCHING AND GLITCH/SPIKE FREE MULTIPLE PHASE SWITCH CIRCUIT

(75) Inventors: Chen-Chih Huang, Hsinchu (TW); Pao-Cheng Chiu, Taipei (TW)

(73) Assignee: Realtek Semiconductor Corp. (TW)

( * ) Notice: Subject to any disclaimer, the term of this patent is extended or adjusted under 35 U.S.C. 154(b) by 0 days.

(21) Appl. No.: 10/156,341

(22) Filed: May 28, 2002

(65) Prior Publication Data

US 2002/0191431 A1 Dec. 19, 2002

(30) Foreign Application Priority Data

May 29, 2001 (TW) ........................................ 90112964 A

(51) Int. Cl.[7] .......................... H03K 17/00; H03K 3/00; G06F 1/04
(52) U.S. Cl. ........................................ 327/99; 327/298
(58) Field of Search ........................ 327/99, 294, 298, 327/299; 713/501, 502

(56) References Cited

U.S. PATENT DOCUMENTS

| | | | | |
|---|---|---|---|---|
| 5,483,185 A | * | 1/1996 | Scriber et al. | 327/99 |
| 5,623,223 A | * | 4/1997 | Pasqualini | 327/298 |
| 6,075,392 A | * | 6/2000 | Sandner | 327/145 |
| 6,121,816 A | * | 9/2000 | Tonks et al. | 327/296 |
| 6,452,426 B1 | * | 9/2002 | Tamarapalli et al. | 327/99 |

* cited by examiner

Primary Examiner—Tuan T. Lam

(57) ABSTRACT

The present invention is to provide a multiple phases switching circuit which is operable with a multiple phase signal generator and a succeeding circuit. The multiple-phase signal generator generates N multiple-phase clock signals. Phases of the multiple-phase clock signals are different. The multiple phases switching circuit comprises an alternative signal generator and a multiplexer. The alternative signal generator outputs an alternative signal according to an up/down switching signal. The multiplexer is coupled to the alternative signal generator for receiving the multiple-phase clock signals and proceeding a glitch/spike preventing process according to the alternative signal so as to output a target clock signal to the succeeding circuit.

14 Claims, 14 Drawing Sheets

BI-DIRECTION SWITCHING AND GLITCH/SPIKE FREE MULTIPLE PHASE SWITCH CIRCUIT

BACKGROUND OF THE INVENTION (a). Field of the Invention

The present invention relates to a phase switch circuit. Especially, the present invention relates to a phase switch circuit that can switch bi-directionally and avoid glitch/spike.

(b). Description of the Prior Arts

In a data recovery system, the high frequency of the received signal that declining and impacted by the noise of media will be recovered by a equalizer, however, a correct sampling of data stream still depends on a precise clock. The rising/falling edge of the clock needs to align precisely to the middle of data stream to obtain correct sampling. In prior art, a data recovery system employs a continuous time Phase-Locked Loop (PLL) to complete the job of clock recovery, and with which align with the data stream received and the sampling clock. The disadvantages of clock recovery that employing the continuous time PLL are as follows: (1) longer lock time (2) influence of phase noise (3) only providing one receive channel.

In current trend of technology, the multiple phase system will be adapted to handle the clock recovery that described above. With the switch of phase signal, the proper phase signal being selected in the multiple phase system will make the rising/falling edge of the recovered sampling clock align preciously to the middle of the data stream, which will theoretically make bit error rate to the minimum level. The rapid lock-in is the advantage of using the switch of multiple phases to handle the clock recovery, that is, the lock-in will be completed only in few clock cycle, and since most calculation is in digital format, the influence of noise will be avoided to increase the yield, more over, the multiple phases clock will provide multiple receive channels to be shared concurrently.

The clock recovery system that employing the multiple phases is shown in the FIG. 1(a), the received data stream and the system's clock will be processed by a digital signal processor 10 (DSP) to obtain the information of the relative time of the clock and the data stream, and the information will be used to determine whether the clock ahead or behind the best point of sampling, thereafter, a up/down switching signal will be sent to the multiple phases switching circuit 11 to switch the output of different phases clock., with this mechanism the proper recovered clock will be generated and the latch 12 will complete the sampling and output the received data. The FIG. 1(b) is showing the diagram of the clock of the system described above, the system will obtain 8 multiple phases clock (ck0–ck7) that spreading evenly on 360 degree, the data stream in the figure is showing the time frame of receiving data, as shown, the best clock for sampling is ck4 whose rising edge aligning preciously to the middle of two consecutive rising/falling edge of the received data, which makes the bit error rate low down to the minimum level. The operation in the FIG. 1(a) is showing a example, if the wave of the recovery clock that outputting from the multiple phases switching circuit 11 is same as the one shown in FIG. 1(c), that is, the rising edge of the starting clock is aligning to ck2, and then switching to ck3 and ck4 sequentially thru the process of the digital signal, and finally locking on the ck4, then, the clock recovery eventually being completed. However, the example in FIG. 1(c) is a better one in clock recovery, in practice, the glitch/spike that caused by the control signal of phase switching in different time frame is ought to be taken into account, as shown in the FIG. 1(d), if special attention has not been paid in the time of switching, the glitch/spike 13 will appear in clock recovery and cause error sampling. The major feature in clock recovery system is that the switching phase has to move upward or downward (positive phase or negative phase), since the starting phase can be ahead or behind the idealist phase. In prior art, in order to avoid the glitch/spike, the phase switch technology only switch one direction, for the multiple phases clock is spreading evenly on 360 degrees, one direction switching still can switch to the phase properly, however, in the application of clock recovery, one direction switching will increase the average lock-in time; for example, in a positive phase one direction switching circuit, if the proper phase is the adjacent negative phase, the phase switcher needs to switch almost 360 degrees toward the positive phase to reach the target negative phase, the data selected in the process of sampling will not be assured to be correct; the application is pretty limited.

More, the phase switching circuit is not only employed in the data recovery system, but also in a fractional-N frequency synthesizer. A conventional fractional-N frequency synthesizer accomplish the frequency synthesizing by swallow a pulse in a fixed time, as shown in FIG. 2(a) the system is comprising the phase detector 20, the charge pump 22, the voltage control oscillator 23 and the pulse swallow 24. The corresponding clock diagram is shown in FIG. 3(b), the original clock is shown in FIG. 3(a), the original clock frequency is $f1=1/Ts$, if a pulse is swallowed in time of Tp, which will be equivalent to the output frequency $f1-(1/Tp)$ of the voltage control oscillator 22, with the control of length of the time of Tp, the non-integer multiple of f1 (reference frequency) can be synthesized, conventionally, a counter can be used to accomplish this function. But, since swallowing a pulse directly will cause a bigger clock jitter on clock signal, the multiple phase clock signal will be employed to swallow a pulse gradually in modern circuit design in order to low down the clock signal jitter caused by the sudden change of frequency. A practical example is to accomplish the all 360 degree phase switching within a certain time period, that is, to switch sequentially a complete phase within few cycles, and with which swallow a pulse gradually. The system shown in FIG. 2(b) is employing the multiple phase clock signal to swallow a pulse gradually, the difference that differing from the FIG. 2(a) is that the voltage control oscillator 23 and the pulse swallow 24 are replaced by the multiple voltage control oscillator 25 and the multiple phase switching circuit 21, within, a up/down switching signal is adapted to control the multiple phase switching circuit and further switch the output of different phase clock. The corresponding diagram of clock is shown in FIG. 3(c), the original clock is shown in FIG. 3(a), the original clock frequency is $f1=1/Ts$, if one fourth of a pulse is swallowed within every 3 clock cycles (3Ts) in time of Tp, a entire pulse will be swallowed within 12 clock cycles, which will be equivalent to the output frequency $f1-(1/Tp)$ of the voltage control oscillator 22, with the control of the time length of Tp, the non-integer multiple of f1 (reference frequency) can be synthesized.

The operation of sequential phases switching is essential in the fractional-N frequency synthesizer described above. Therefore, to avoid the glitch/spike in phase switching is a major consideration of circuit design, in the application of clock recovery, the occurrence of glitch/spike will cause data sampling error, also the bit error rate increase; and in the application of fractional-N frequency synthesizer, the glitch/spike will response for bigger phase noise. How to avoid the glitch/spike in phase switching is a key issue when a designer designing circuit.

To this end, the primary purpose of the present invention is to develop a phase switching circuit that will switch forward/backward bi-directionally in phase switching and will avoid the glitch/spike when any time enabling the signal switching.

SUMMARY OF THE INVENTION

The primary aspect of the present invention is to provide a multiple phases switching circuit, which can be used in a multiple phase signal generator and a succeeding circuit, in the same time, the multiple phase signal generator will generate N multiple phases clock signals that spreading 360 degrees, the phase of any clock signal is ahead of the phase of the next coming clock signal, the multiple phase switching circuit comprises:

a alternative signal generator used to output n alternative signals, only one of the n signals with base "1", the rest with base "0", the alternative signal generator is controlled by a up/down switching signal that will change the base "0" signal being adjacent up/down to the base "1" alternative signal to base "1" signal, also, the alternative signal generator will be triggered by a synchronized signal to output the n alternative signals that being transformed; a multiplexer which connected electrically with the multiple phases signals generator, the alternative signal generator and the succeeding circuit, the multiplexer will receive the input of n clock signals and n alternative signals and output a target clock signal corresponding the alternative signal with base "1" to provide the usage for the succeeding circuit, in this case, the target clock signal is used to be a synchronized signal and feedbacks to the alternative signal generator.

Based on the above conception, the succeeding circuit that employing the multiple phases switching circuit is a data recovery system.

Based on the above conception, the succeeding circuit that employing the multiple phases switching circuit is a fractional-N frequency synthesizer.

Based on the above conception, the alternative signal generator in the multiple phases switching circuit is comprising a finite state machine that used to output n alternative signals in the same time, only one of the n signals with base "1", the rest with base "0", the alternative signal generator is controlled by a up/down switching signal that will change the base "0" signal being adjacent up/down to the base "1" alternative signal to base "1" signal; and a synchronizer that connected electrically to the output end of n alternative signals of the multiplexer and the finite state machine, also, the synchronizer will be triggered by the synchronized signal to output the n alternative signals that outputted from the finite state machine.

Based on the above conception, the synchronizer in the multiple phases switching circuit comprises n D style flip-flops.

Based on the above conception, the multiplexer in the multiple phases switching circuit comprises n phase switching units that receiving respectively the signals inputting from n clock signals and n alternative signals and generating n output signals, when the received alternative signal is with the base "0" and the state is disable, the output signal will be with the base "0", when the received alternative signal is with the base "1" and the state is enable, the received clock signal will be output as the output signal; and a OR gate processor that used to receive and process n signals that outputting from n phase switching units and output the target clock signal.

Based on the above conception, the multiplexer in the multiple phases switching circuit comprises n phase switching units that receiving respectively the signals inputting from n clock signals and n alternative signals and generating n output signals, when the received alternative signal is with the base "0" and the state is disable, the output signal will be with the base "0", when the received alternative signal is with the base "1" and the state is enable, the received clock signal will be output as the output signal; and a NOR gate processor that used to receive and process n signals that outputting from n phase switching units and output the target clock signal.

Based on the above conception, the multiplexer in the multiple phases switching circuit comprises n phase switching units that receiving the corresponding clock signal, the up adjacent signal and n alternative signals and then proceed a glitch/spike prevent process to generate n output signals, the glitch/spike prevent process is; when the alternative signals is with base "0" and the corresponding clock signal is with base "0", the signal that outputting from the phase switching unit is with base "0", but when the alternative signals is with base "1" and the prior state of the alternative signal is with base "0", if the corresponding clock signal is with base "1" and the up adjacent clock signal is with base "0", the corresponding clock signal will be outputted as the output signal that output from the phase switching unit; and a OR gate processor that used to receive and process n signals that outputting from n phase switching units and output the target clock signal.

Based on the above conception, the multiplexer in the multiple phases switching circuit comprises n phase switching units that receiving the corresponding clock signal, the up adjacent signal and n alternative signals and then proceed a glitch/spike prevent process to generate n output signals, the glitch/spike prevent process is; when the alternative signals is with base "0" and the corresponding clock signal is with base "0", the signal that outputting from the phase switching unit is with base "0", but when the alternative signals is with base "1" and the prior state of the alternative signal is with base "0", if the corresponding clock signal is with base "1" and the up adjacent clock signal is with base "0", the corresponding clock signal will be outputted as the output signal that output from the phase switching unit; and a NOR gate processor that used to receive and process n signals that outputting from n phase switching units and output the target clock signal.

The second aspect of the present invention is to provide a multiple phases switching circuit, which can be used in a multiple phase signal generator and a succeeding circuit, in the same time, the multiple phase signal generator will generate N multiple phases clock signals that spreading 360 degrees, the phase of any clock signal is ahead of the phase of the next coming clock signal, the multiple phase switching circuit comprises:

a alternative signal generator used to output n alternative signals, only one of the n signals with base "1", the rest with base "0", the alternative signal generator is controlled by a up/down switching signal that will change the signal being adjacent up/down to the base "1" alternative signal to base "1" signal; a multiplexer which connected electrically with the multiple phases signals generator, the alternative signal generator and the succeeding circuit, the multiplexer comprises n phase switching units and a OR gate processor, the phase switching units are used to receive the corresponding clock signal, the up adjacent signal and n alternative signals and then proceed a glitch/spike prevent process to generate n output signals, the glitch/spike prevent process is; when the alternative signals is with base "0" and the corresponding clock signal is with base "0", the signal that outputting from the phase switching unit is with base "0", but when the alternative signals is with base "1" and the prior state of the alternative signal is with base "0", if the corresponding clock signal is with base "1" and the up adjacent clock signal is with base "0", the corresponding clock signal will be outputted as the output signal that output from the phase switching unit and the OR gate processor will be used to receive and process n signals that outputting from n phase switching units and output the target clock signal for the succeeding circuit.

Based on the above conception, the succeeding circuit that employing the multiple phases switching circuit is a data recovery system.

Based on the above conception, the succeeding circuit that employing the multiple phases switching circuit is a fractional-N frequency synthesizer.

Based on the above conception, the alternative signal generator in the multiple phases switching circuit is comprising a finite state machine that used to output n alternative signals in the same time, only one of the n signals with base "1", the rest with base "0", the alternative signal generator is controlled by a up/down switching signal that will change the base "0" signal being adjacent up/down to the base "1" alternative signal to base "1" signal.

Based on the above conception, the alternative signal generator in the multiple phases switching circuit further comprises a synchronizer that connected electrically to the output end of n alternative signals of the multiplexer and the finite state machine, also, the synchronizer will be triggered by the synchronized signal to output the n alternative signals that outputted from the finite state machine.

Based on the above conception, the synchronizer in the multiple phases switching circuit comprises n D style flip-flops.

The third aspect of the present invention is to provide a multiple phases switching circuit, which can be used in a multiple phase signal generator and a succeeding circuit, in the same time, the multiple phase signal generator will generate N multiple phases clock signals that spreading 360 degrees, the phase of any clock signal is ahead of the phase of the next coming clock signal, the multiple phase switching circuit comprises: a alternative signal generator used to output n alternative signals, only one of the n signals with base "1", the rest with base "0", the alternative signal generator is controlled by a up/down switching signal that will change the signal being adjacent up/down to the base "1" alternative signal to base "1" signal; a multiplexer which connected electrically with the multiple phases signals generator, the alternative signal generator and the succeeding circuit, the multiplexer comprises n phase switching units and a NOR gate processor, the phase switching units are used to receive the corresponding clock signal, the up adjacent signal and n alternative signals and then proceed a glitch/spike prevent process to generate n output signals, the glitch/spike prevent process is; when the alternative signals is with base "0" and the corresponding clock signal is with base "0", the signal that outputting from the phase switching unit is with base "0", but when the alternative signals is with base "1" and the prior state of the alternative signal is with base "0", if the corresponding clock signal is with base "1" and the up adjacent clock signal is with base "0", the corresponding clock signal will be outputted as the output signal that output from the phase switching unit and the NOR gate processor will be used to receive and process n signals that outputting from n phase switching units and output the target clock signal for the succeeding circuit.

Based on the above conception, the succeeding circuit that employing the multiple phases switching circuit is a data recovery system.

Based on the above conception, the succeeding circuit that employing the multiple phases switching circuit is a fractional-N frequency synthesizer.

Based on the above conception, the alternative signal generator in the multiple phases switching circuit is comprising a finite state machine that used to output n alternative signals in the same time, only one of the n signals with base "1", the rest with base "0", the alternative signal generator is controlled by a up/down switching signal that will change the base "0" signal being adjacent up/down to the base "1" alternative signal to base "1" signal.

Based on the above conception, the alternative signal generator in the multiple phases switching circuit further comprises a synchronizer that connected electrically to the output end of n alternative signals of the multiplexer and the finite state machine, also, the synchronizer will be triggered by the synchronized signal to output the n alternative signals that outputted from the finite state machine, the synchronized signal the target clock signal that output from the OR gate processor.

Based on the above conception, the synchronizer in the multiple phases switching circuit comprises n D style flip-flops.

The appended drawings will provide further illustration of the present invention, together with the description, serve to explain the principles of the invention.

DETAILED DESCRIPTION OF THE PRESENT INVENTION

Figure 1A:
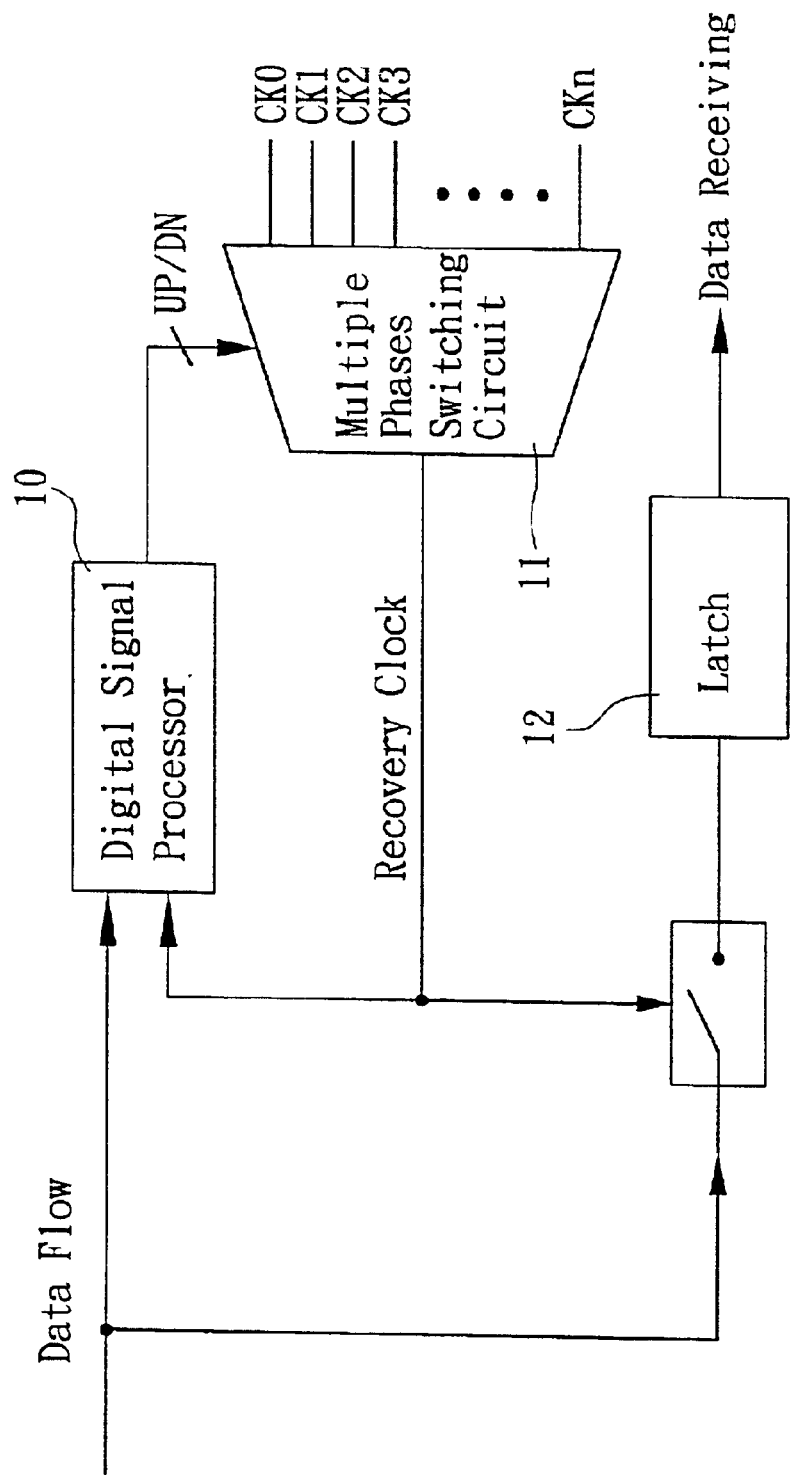
FIG. 1(a) shows the diagram of the clock recovery system that employing the multiple phase system in prior art.
Figure 1B:
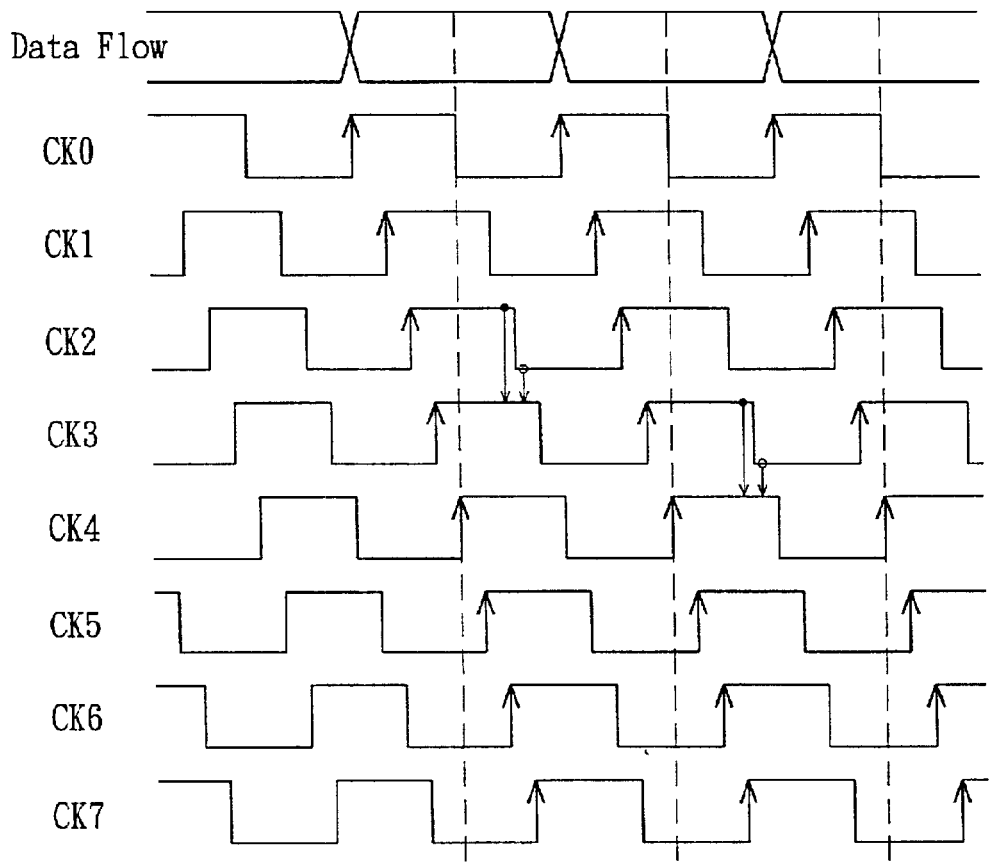
FIGS. 1(b)(c)(d) show the diagram of the wave of the clock signal that being shown in the FIG. 1(a).
Figure 1C:
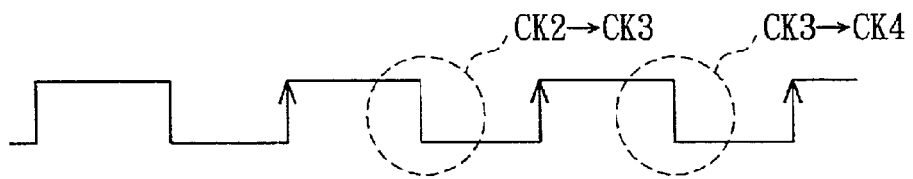
Figure 1D:
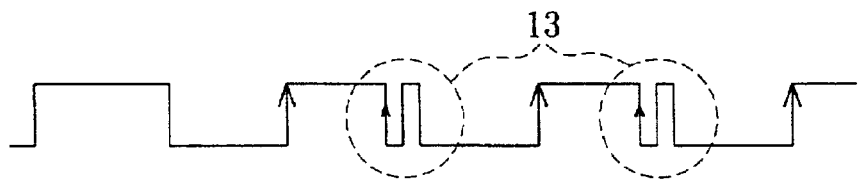
Figure 2A:
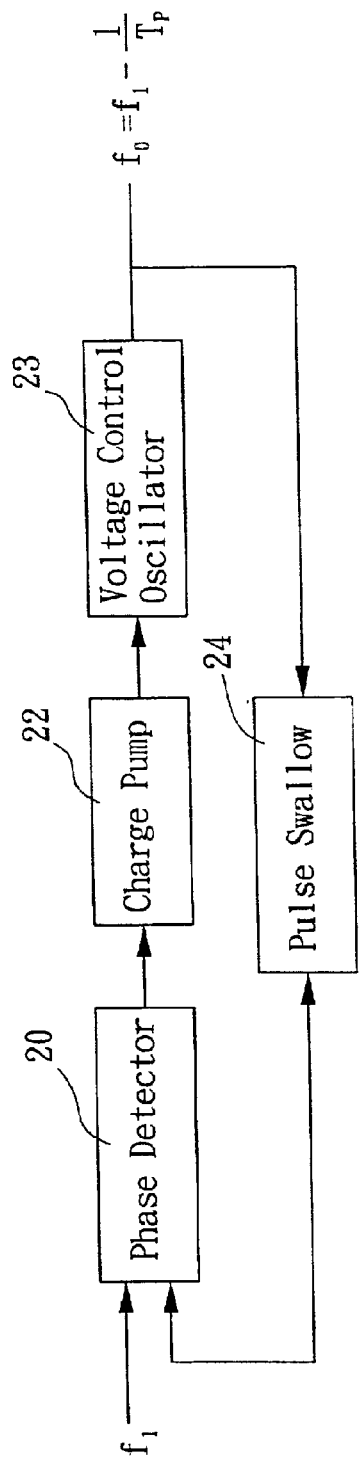
FIG. 2(a) shows the systematic diagram of the fractional-N frequency synthesizer in prior art.
Figure 2B:
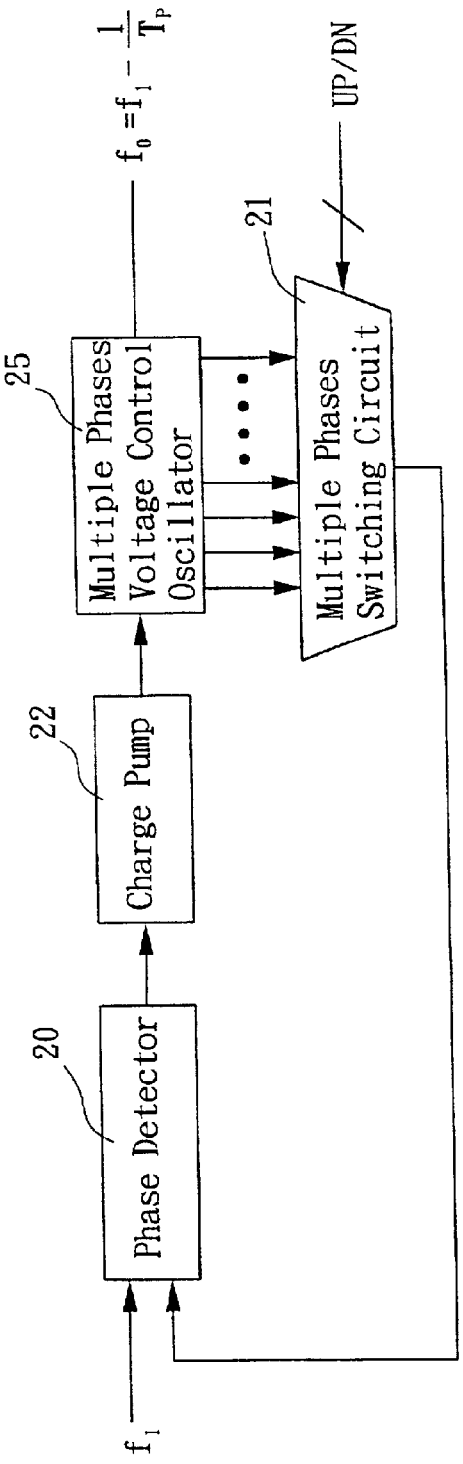
FIG. 2(b) shows the systematic diagram of the fractional-N frequency synthesizer that employing the multiple phase clock signal to swallowing a pulse gradually.
Figure 3:
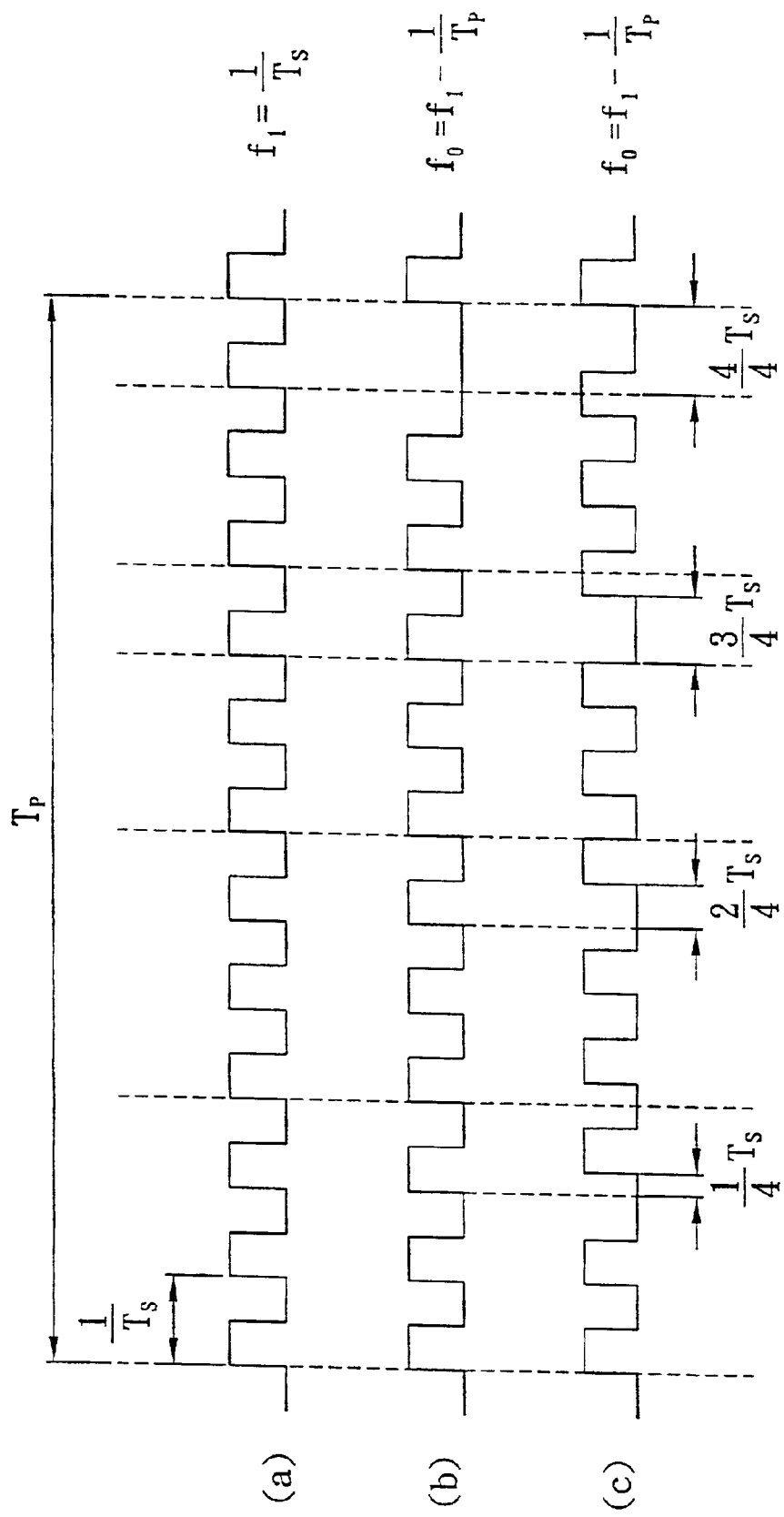
FIGS. 3(a)(b)(c) show the diagram of the wave of the clock signal of the fractional-N frequency synthesizer that showing in FIGS. 1(a)(b).
Figure 4A:
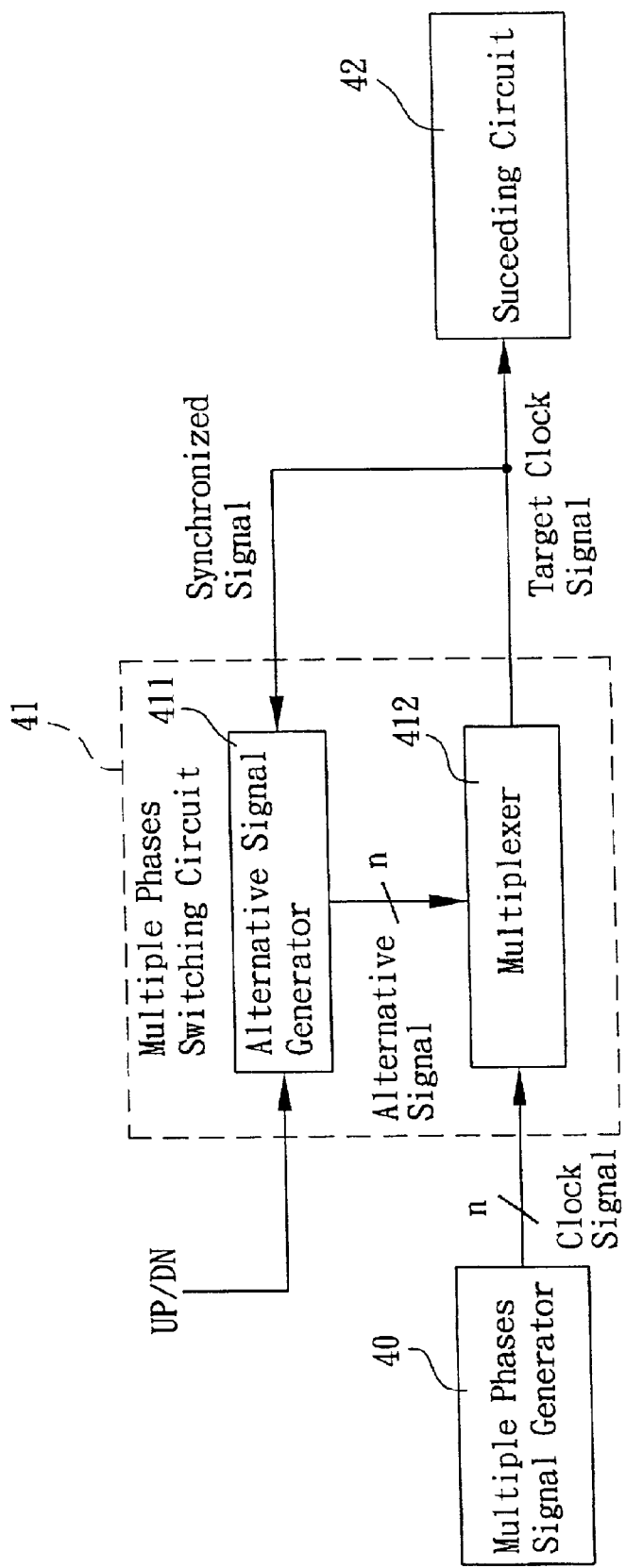
FIG. 4(a) shows the functional diagram of the preferred embodiment of the multiple phases switching circuit of the present invention.
Figure 4B:
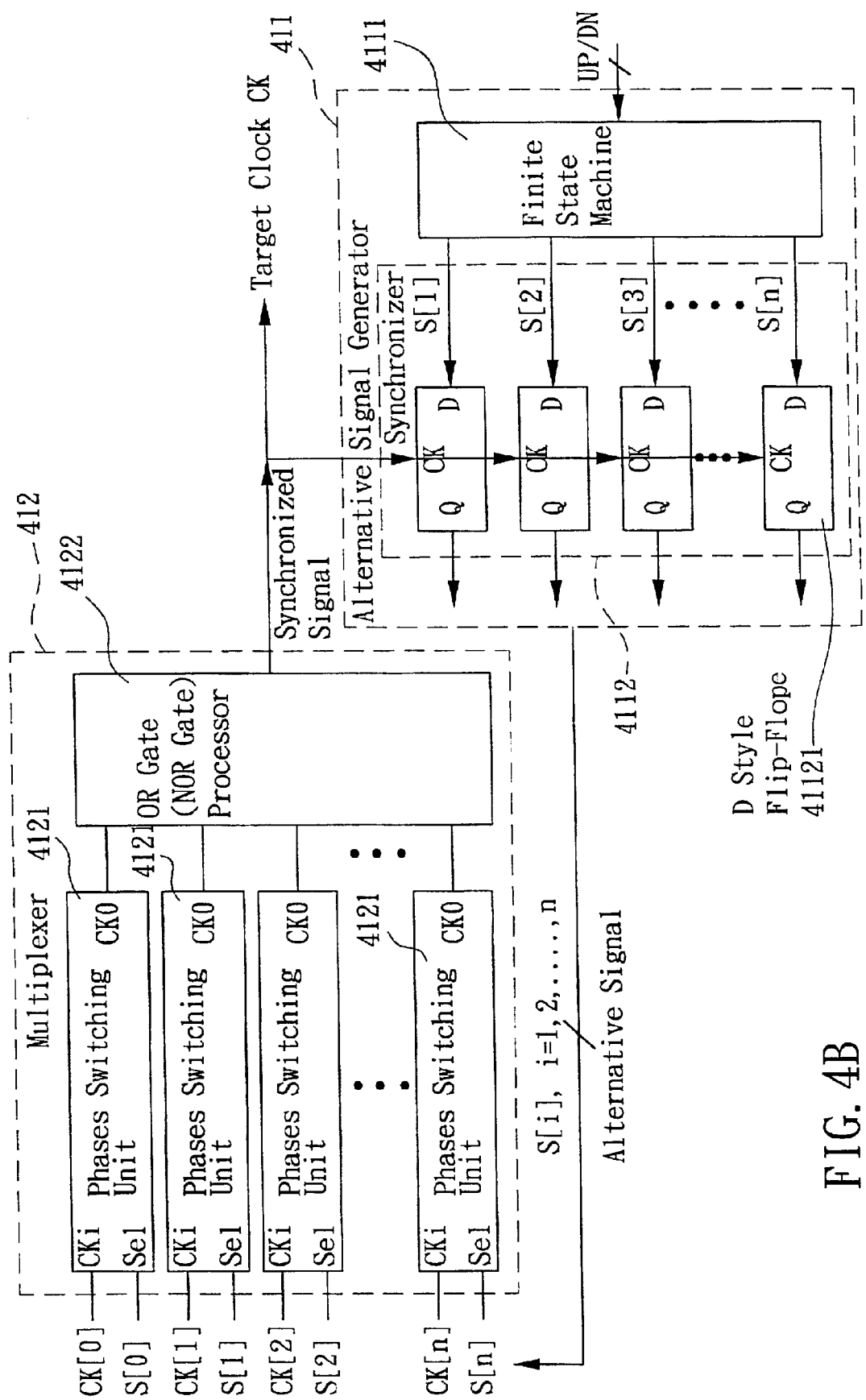
FIG. 4(b) shows the diagram of the internal function of the first embodiment of the alternative signal generator and the multiplexer.
Figure 4C:
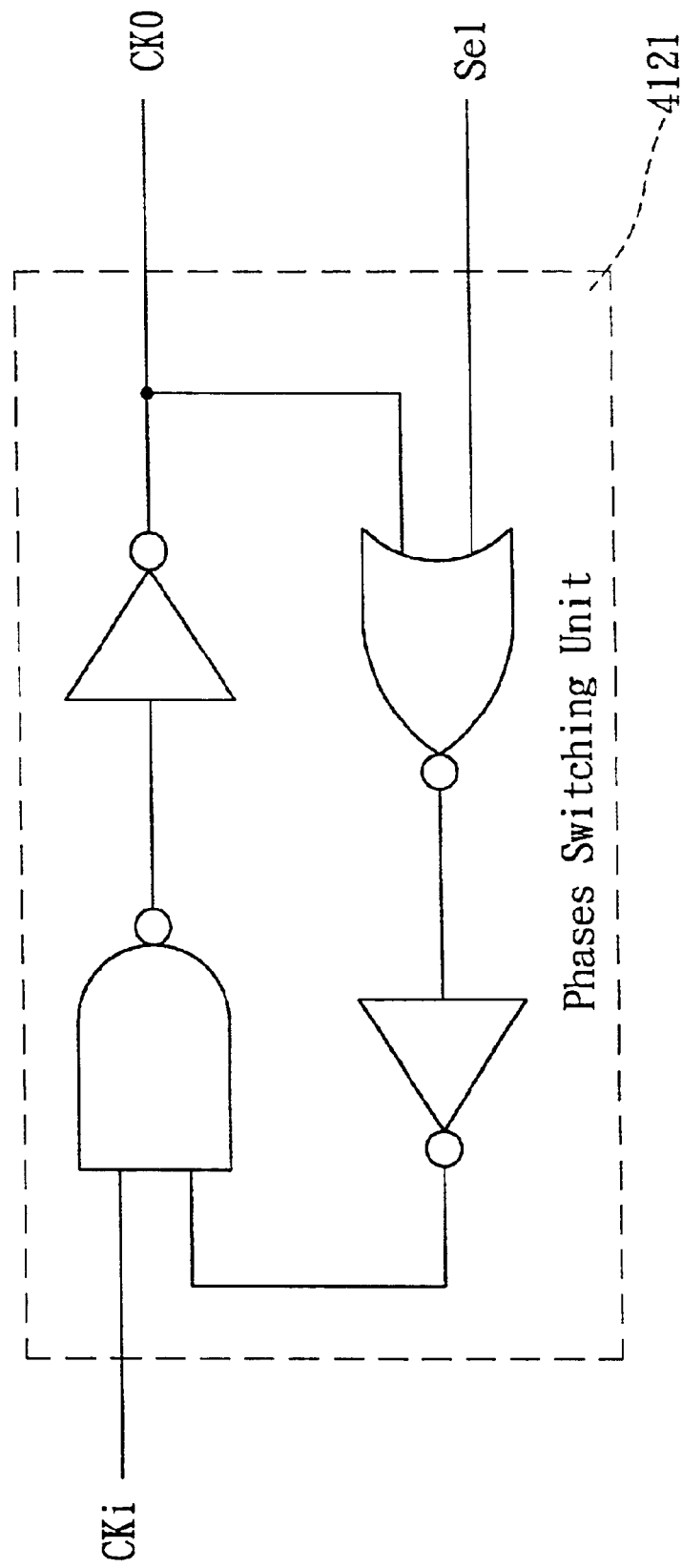
FIG. 4(c) shows the diagram of the embodiment of the first logic circuit of the phase switching unit.

FIG. 4(*a*) shows the functional diagram of the preferred embodiment of the multiple phases switching circuit of the present invention, wherein, the multiple phases switching circuit 41 is working between the a multiple phases signal generator 40 and a succeeding circuit 42, the multiple phases signal generator 40 will generate concurrently n clock signals and the fix phase difference exists between any two adjacent clock signals. The multiple phases switching circuit 41 comprises an alternative signal generator 411 and a multiplexer 412. The alternative signal generator 411 is used to output n alternative signals, only one of the n signals with base "1", the rest with base "0", the alternative signal generator is controlled by an up/down switching signal that will change the signal being adjacent up/down to the base "1" alternative signal to base "1" signal, the alternative signal generator 411 is also triggered by a synchronized signal to output the n alternative signals that being transformed. The multiplexer 412 will receive the input of n clock signals and n alternative signals and output a target clock signal corresponding the alternative signal with base "1" to provide the usage for the succeeding circuit, in this case, the target clock signal is used to be a synchronized signal and is the feedback to the alternative signal generator. The succeeding circuit that employing the multiple phases switching circuit can be a data recovery system, or a fractional-N frequency synthesizer.

Please refer to FIG. 4(*b*). The FIG. 4(*b*) shows the diagram of the internal function of the first embodiment of the alternative signal generator 411 and the multiplexer 412. The alternative signal generator 411 comprises a finite state machine 4111 and the synchronizer 4112. The finite state machine 4111 is used to output n alternative signals in the same time, only one of the n signals with base "1", the rest with base "0", the alternative signal generator is controlled by a up/down switching signal that will change the base "0" signal being adjacent up/down to the base "1" alternative signal to base "1" signal; and the synchronizer 4112 comprises n D style flip-flops, and which connected electrically to the output end of n alternative signals of the multiplexer 412 and the finite state machine 4111, also, the synchronizer 4112 will be triggered by the synchronized signal to output said n alternative signals that outputted from the finite state machine.

The multiplexer 412 comprises n phase switching units 4121 and a OR gate (or NOR gate) processor 4122, the phase switching units 4121 are used to receive n corresponding clock signals (ck [0], ck [1], . . . ck[n]) and n alternative signals (s[0], s[1], . . . s[n]) and then proceed a glitch/spike prevent process to generate n output signals and output to the OR gate (or NOR gate) processor 4122, when the alternative signals Sel that received by the phase switching units 4121 is with base "0" and the state is disable, the output signal CKo will be with the base "0", when the received alternative signal Sel is with the base "1" and the state is enable, the received clock signal CKi will be output as the output signal CKo and output to the OR gate (or NOR gate ) processor 4122. The OR gate (or NOR gate) processor 4122 will process the OR (or NOR) operation after it received the n output signals that outputted from the n phases switching units and will output the result to the target clock signal.

FIG. 4(*c*) shows the diagram of the embodiment of the first logic circuit of the phase switching unit 4121 that being described above. The logic will be described as follows:

When (Sel=1) {CKo=Cki, means Cki transferring to Cko}

When (Sel=0) and (Cki=0){Cko=0}.

When the alternative signals Sel that received by the phase switching units 4121 is with base "0" and the state is disable, the output signal CKo will be with the base "0", when the received alternative signal Sel is with the base "1" and the state is enable, the received clock signal CKi will be output as the output signal CKo and output to the OR gate (or NOR gate) processor 4122. The OR gate (or NOR gate) processor 4122 will process the OR (or NOR) operation after it received the n output signals that outputted from the n phases switching units and will output the result to the target clock signal. Therefore, when the alternative signals Sel is equal to 1 (enable), the CKi will be transferred to CKo, and when the alternative signals Sel is equal to 0 (disable) and CKi is equal to 0, CKo will be set to 0. The alternative signals Sel follows the above pattern to control if CKi transferred to CKo, and the target clock signal CK will be executed with OR (or NOR) operation by CKo [n] (n=1, 2, 3, . . . n).

Figure 5A:
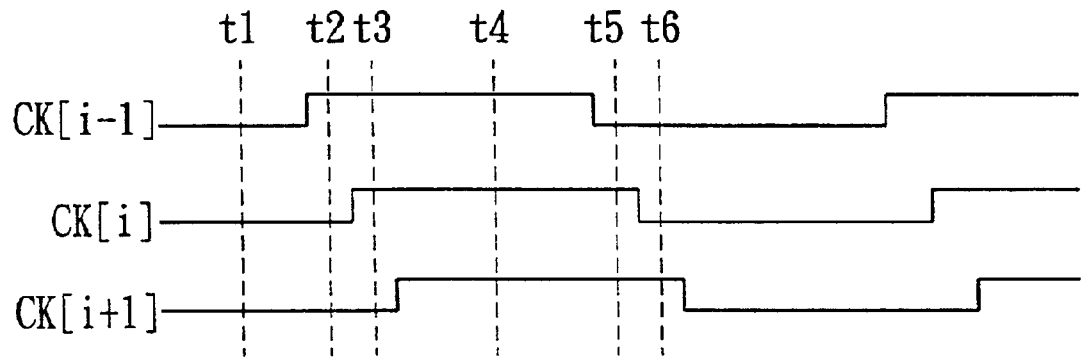
FIGS. 5(a)(b)(c) show the diagram of the change of the clock signal of the switch phase that proceeding a algorism in the first embodiment.
Figure 5B:
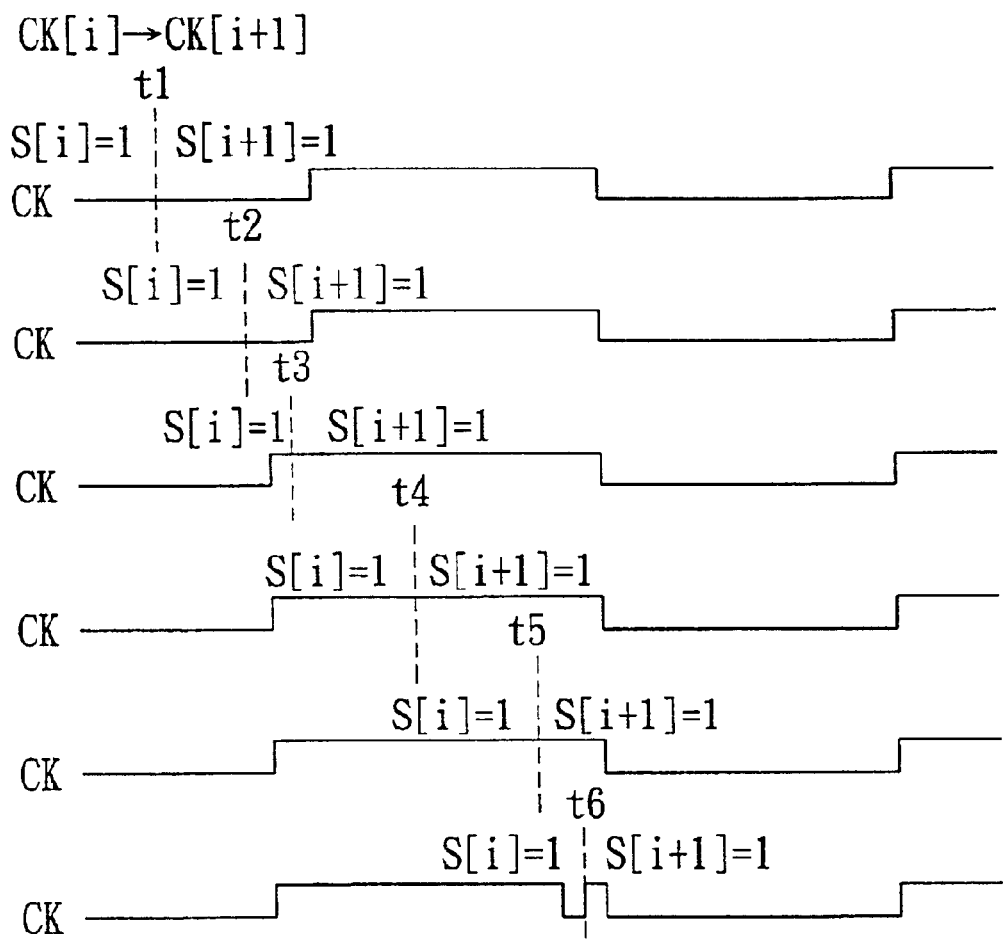
Figure 5C:
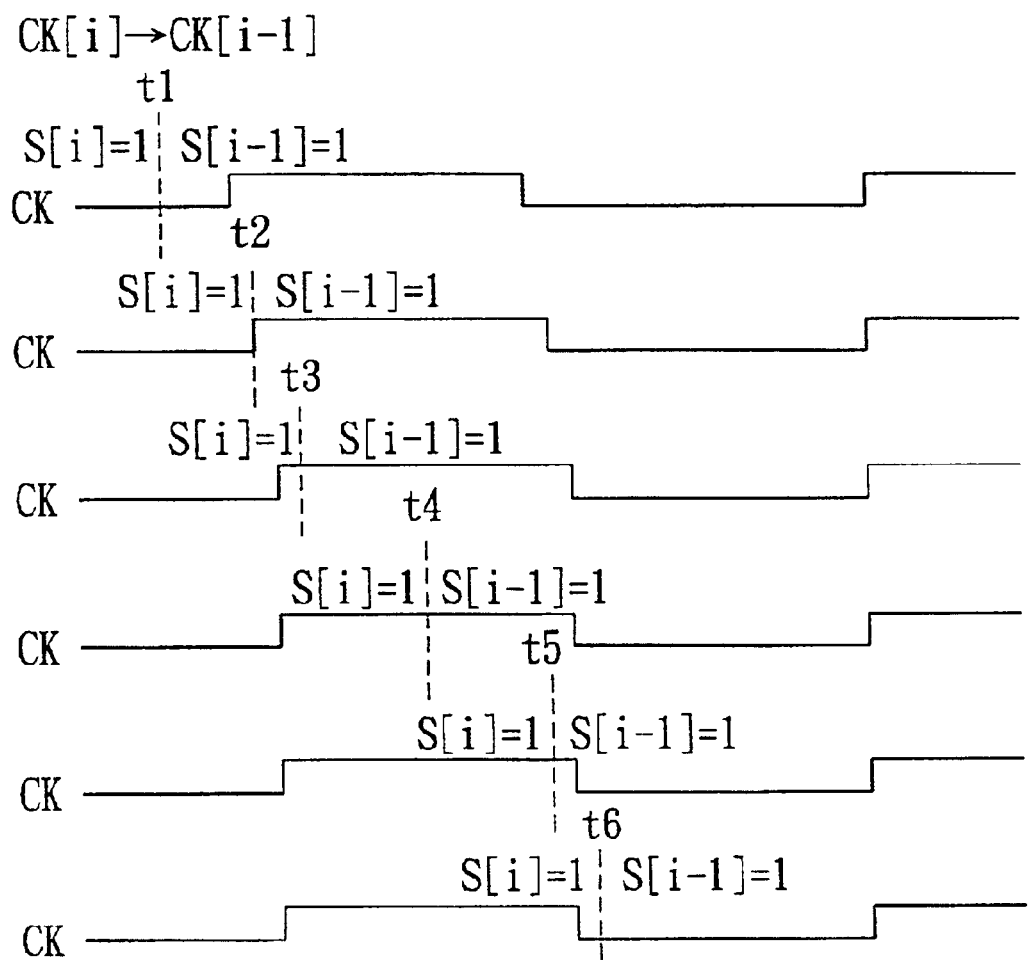
Figure 7A:
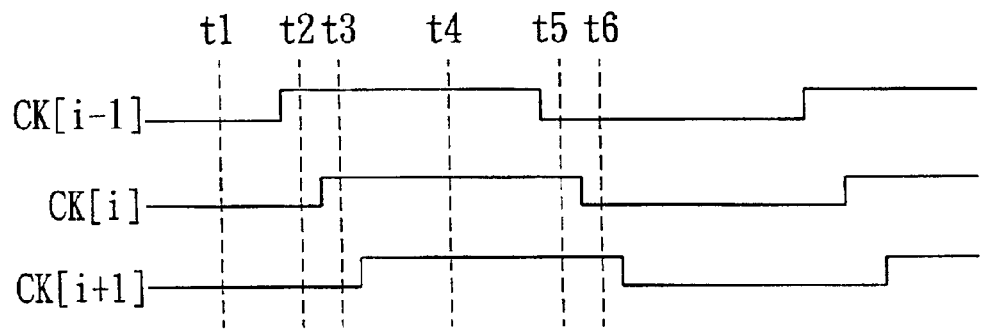
FIGS. 7(*a*)(*b*)(*c*) show the diagram of the change of the clock signal of the switch phase that proceeding a algorism in the second embodiment.
Figure 7B:
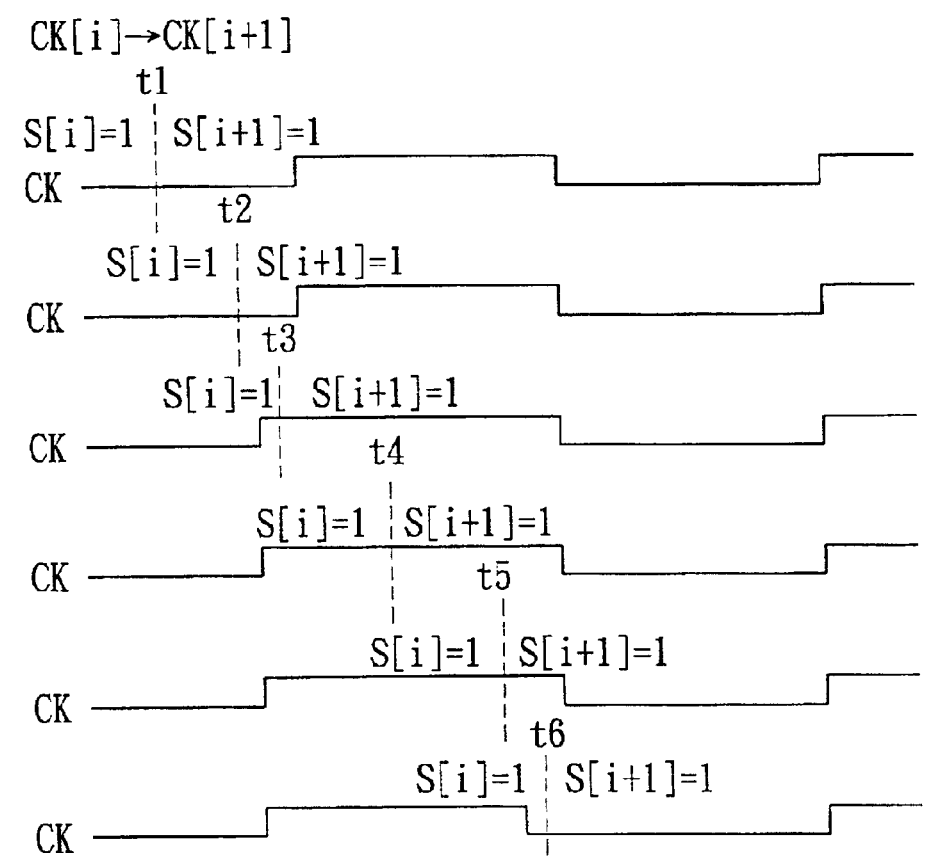
Figure 7C:
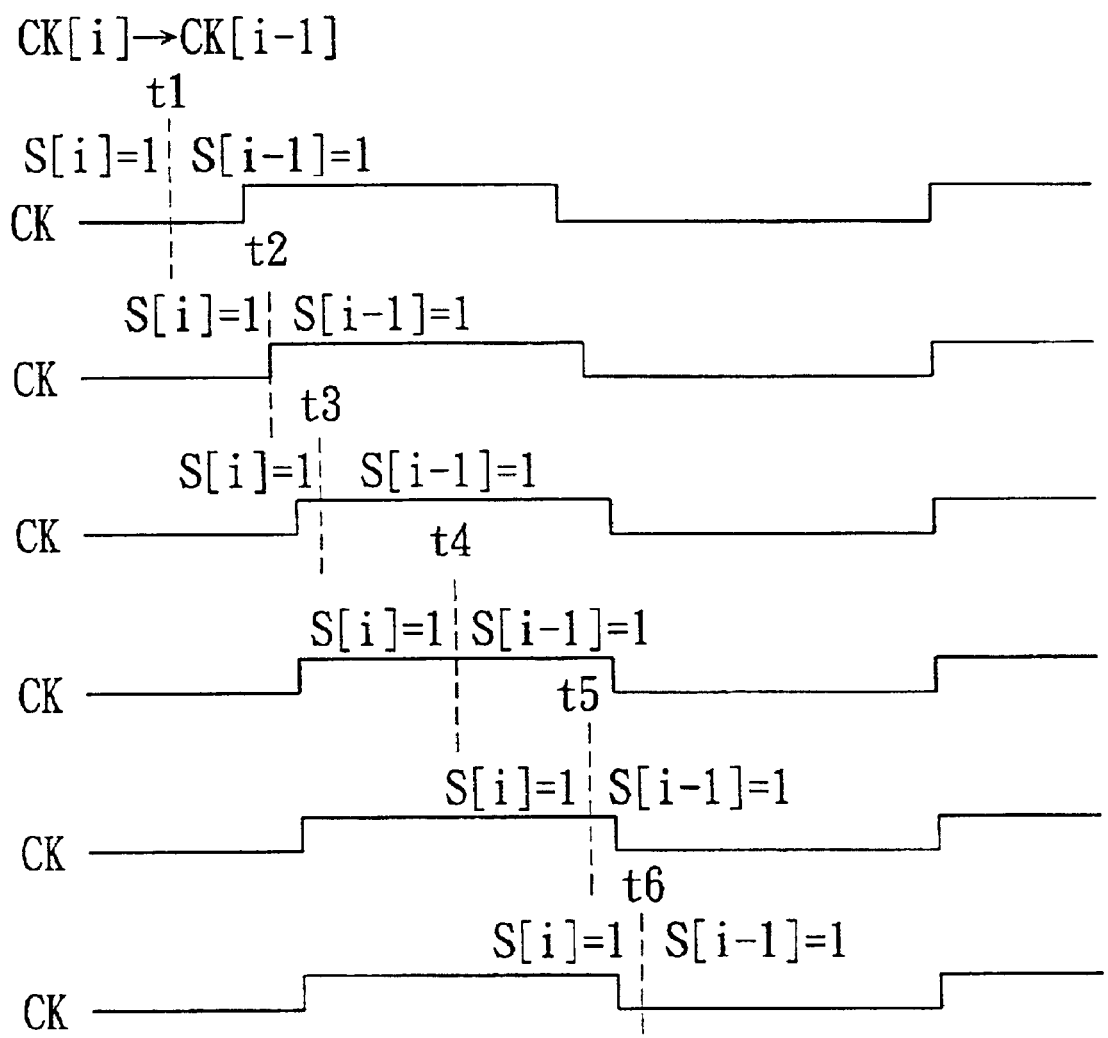

FIGS. 5(*a*)(*b*)(*c*) show the diagram of the change of the clock signal of the switch phase that proceeding the algorism described above. FIG. 5(*a*) is showing three adjacent clock signals ck[i−1], ck[i], ck[i+1]. FIG. 5(*b*) is showing the diagram that the target clock signal CK switching from ck[i] to ck[i+1] during the time period of t1 to t6 and the FIG. 5(*c*) is showing the diagram that the target clock signal CK switching from ck[i] to ck[i−1] during the time period of t1 to t6. From these two diagrams, only at the time t6 that ck[i] switching to ck[i+1], the glitch/spike occurred. However, since the alternative signal and the output clock CK have been synchronized, by using the delay in the circuit to avoid the change of controlling signal during the time period, the occurrence of glitch/spike will not be generated from the output clock CK. Thereafter, the phase switching unit can sequentially proceed the forward/backward phase switching, and at any time that the alternative signal switching, the glitch/spike will never occur in the output clock. The OR gate (or NOR gate) processor 4122 can be assembled with simple CMOS logic gate or any other special logic gate, and with proper adjustment of aspect ratio, the precious switching and 50% responsible cycle can be maintained. In the embodiment of the first logic circuit of the phase switching unit 4121 described above, the alternative signal has to be synchronized with the output clock CK to avoid phase switching in the time of t6. To solve this problem, the second logic circuit of the phase switching unit 4121 has been developed, which is shown in the embodiment of FIG. 6(*a*). In the embodiment, a additional reference to the prior adjacent phase clock signal ck[i−1] is made to avoid the occurrence of the condition described above. Of the occurrence of glitch/spike, and the alternative signal can be switched at any time but not generating glitch/spike. Therefore, the alternative signal S[i] will not need to be synchronized with the output clock CK. The logic will be as follows:

When (S[i]=1) and (S_pre[i]=0) {if ((ck[i]=1) and (ck[i−1]=0) not valid) then transfer ck[i] to CK0[i]"}, When (S[i]=0) and (CK[i]=0) { then CK0[i]=0;}, Wherein, S_pre[i] is the prior state of the alternative signal S[i]. When alternative signal S[i]=0 and CK[i]=0, the ith output of clock is set to 0; when the prior state of the alternative signal S[i] is equal to 0 (S_pre[i]=CK[i] is transferred to CK0[i]. FIGS. 7(a)(b)(c) are showing the change of the clock signal that adapting the algorism to switch phase. FIG. 7(a) is a embodiment of three adjacent clock signals ck[i−1], ck[i] and ck[i+1], this embodiment is covering the switch that occurs between any adjacent phase at any time point. FIG. 7(b) is showing the target clock signal CK that switching from ck[i] to ck[i+1] in the tie period of t1 to t6. FIG. 7(c) is showing the target clock signal CK that switching from ck[i] to ck[i−1] in the tie period of t1 to t6. From these two embodiments, the clock signal is transferred to the output (CK0[i]) only when the clock itself (CK[i]) is 0, and which avoids the possible time of the occurrence of the glitch/spike (CK[i]=0 and CK [i+1]=1) that happens in the phase switching forward.

Figure 6A:
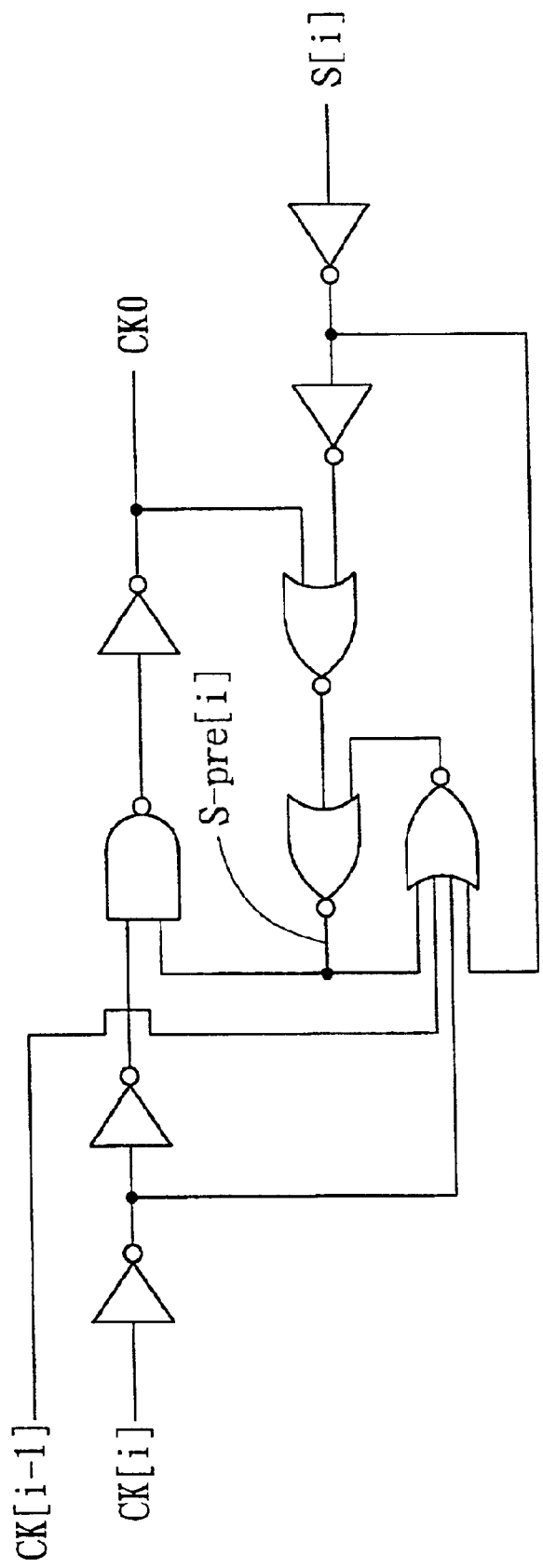
FIG. 6(a) shows the diagram of the embodiment of the second logic circuit of the phase switching unit.
Figure 6B:
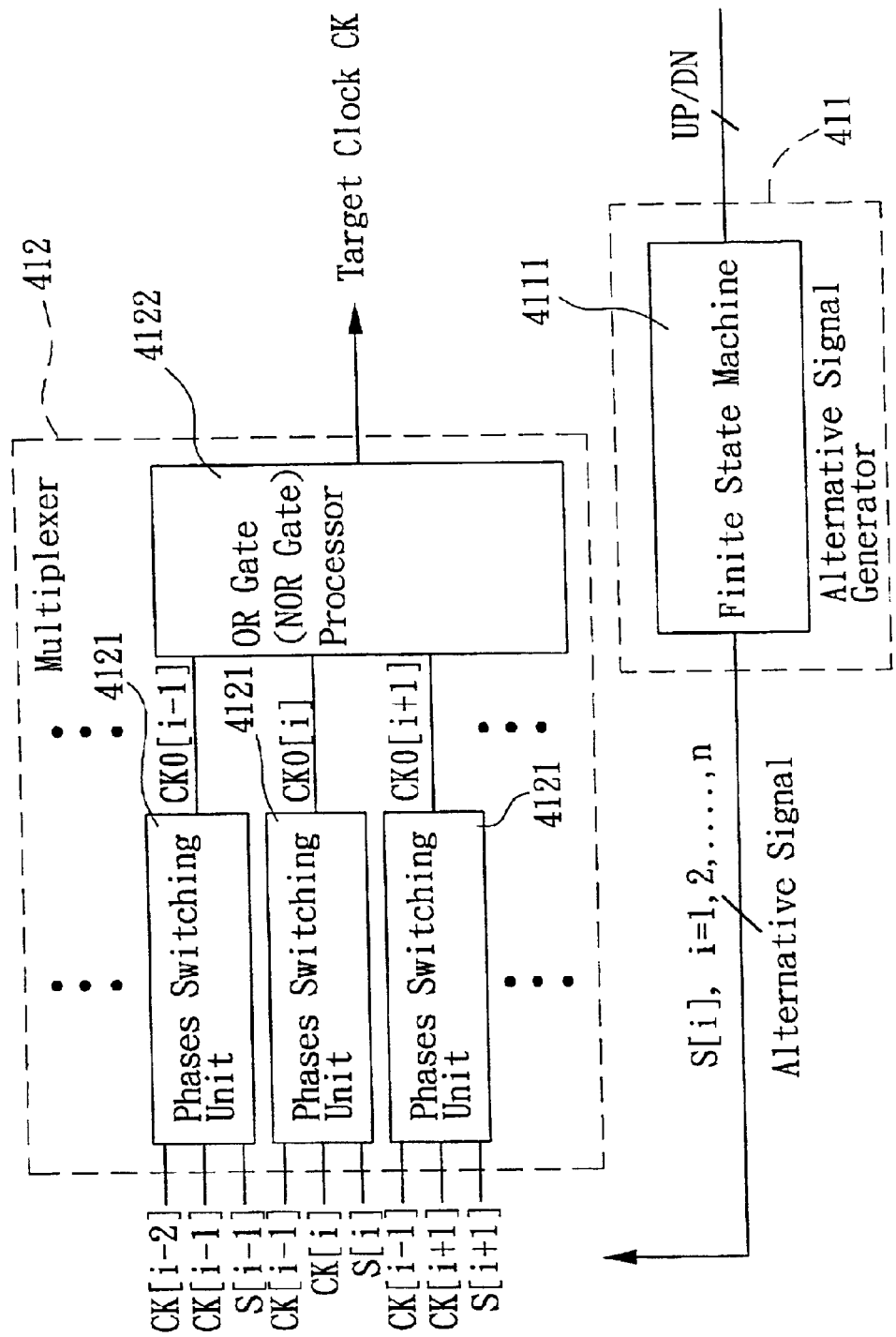
FIG. 6(b) shows the diagram of the internal function of the second embodiment of the alternative signal generator and the multiplexer.

FIG. 6(b) is showing the embodiment of the internal function of the alternative signal generator 411 and the multiplexer 412 that employing the second logic circuit of the phase switching unit 4121, the difference with the first logic circuit is that the procedure of the synchronization of the alternative signal S[i] and the clock CK is omitted.

Figure 8:
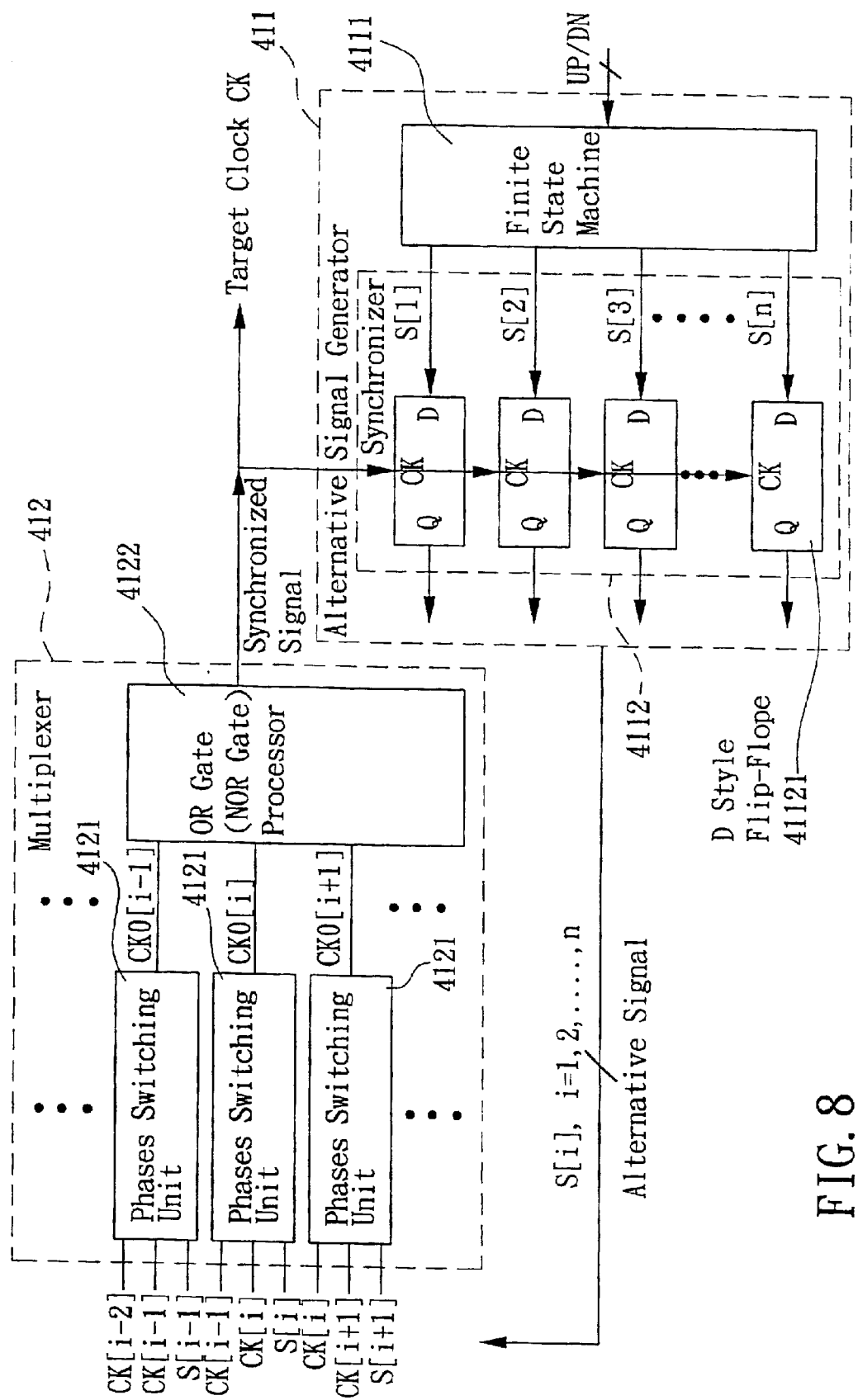
FIG. 8 show the diagram of the internal function of the third embodiment of the alternative signal generator and the multiplexer.

The best of a circuit in practice will be the second embodiment of the mutiplexer 412 that employing the phase switching unit in FIG. 6(a), incorporating with the alternative signal generator 411 that having synchronizer 4112, the symmetric diagram is shown in FIG. 8. Designing the phase switching circuit in such manner will avoid the consideration of the delay of the internal clock. And the synchronized phase control signal will control the occurrence of the phase switching to happen at the certain time that the corresponding output signal occurred and to avoid the occurrence of the glitch/spike, and also the predictability is high.

As a conclusion, the present invention really develops a phase switching circuit that will sequentially switch phase forward/backward bi-directionally and is able to avoid the glitch/spike when any time switching the signal, which totally solve the problem happened in prior art.

What is claimed is:

1. A multiple-phase switching circuit comprising:
a finite state machine for generating an alternative signal according to a switching signal;
a synchronizer, coupled to said finite state machine, for receiving the alternative signal and synchronously outputting the alternative signal according to a target clock signal; and
a multiplexer coupled to said synchronizer, for receiving a plurality of input clock signals and outputting the target clock signal according to the alternative signal;
wherein Phases of the input clock signals are different;
wherein, the finite state machine generates a plurality of alternative signals, only one of the alternative signals is in a first logic level, while the others are in a second logic level; and
wherein, the finite state machine changes the logic level of the alternative signal having the first logic level into the second logic level, and also changes the logic level of another alternative signal which is adjacent to that changed alternative signal into the first logic level according to the switching signal.

2. The multiple-phase switching circuit of claim 1, wherein said multiplexer comprises:
a plurality of phase switching units for receiving the input clock signals and the alternative signals and outputting a plurality of output signals; and
a gate processor for receiving the output signals from the phase switching units and outputting the target clock signal.

3. The multiple-phase switching circuit of claim 2, wherein each phase switching unit receives an alternative signal and at least one input clock signal, the input clock signal received together with the alternative signal which is just changed from the second logic level to the first logic level is outputted by the multiplexer as the target clock signal.

4. The multiple-phase switching circuit of claim 2, wherein said gate processor is either an OR gate processor or an NOR gate processor.

5. The multiple-phase switching circuit of claim 1, wherein said synchronizer comprises a plurality of D-type Flip-Flops.

6. The multiple-phase switching circuit of claim 1, wherein the multiple-phase switching circuit is used with a fractional-N frequency synthesizer.

7. The multiple-phase switching circuit of claim 1, wherein the multiple-phase switching circuit is used with a data recovery system.

8. A multiple-phase switching circuit comprising:
an alternative signal generator for producing an alternative signal according to a switching signal, said alternative signal generator having a finite state machine for producing the alternative signal;
a plurality of phase switching units for receiving a plurality of input clock signals and outputting a plurality of output signals according to the alternative signal; and
a gate processor, coupled to the phase switching units, for receiving the output signals and outputting a target clock signal;
wherein phases of the input clock signals are different;
wherein the finite state machine generates a plurality of alternative signals only one of the alternative signals is in a first logic level, while the others are in a second logic level; and
wherein the finite state machine changes the logic level of the alternative signal having the first logic level into the second logic level, and also changes the logic level of another alternative signal which is adjacent to that changed alternative signal into the first logic level according to the switching signal.

9. The multiple-phase switching circuit of claim 8, wherein said alternative signal generator further comprises:
a synchronizer, coupled to said finite state machine, for receiving the alternative signal and synchronously outputting the alternative signal according to the target clock signal.

10. The multiple-phase switching circuit of claim 8, wherein each phase switching unit receives an alternative signal and at least one input clock signal, the input clock signal received together with the alternative signal which is just changed from the second logic level to the first logic level is outputted the gate processor as the target clock signal.

11. The multiple-phase switching circuit of claim 9, wherein said synchronizer comprises a plurality of D-type Flip-Flops.

12. The multiple-phase switching circuit of claim 8, wherein said gate processor is either an OR gate processor or an NOR gate processor.

13. The multiple-phase switching circuit of claim 8, wherein the multiple-phase switching circuit is used with a fractional-N frequency synthesizer.

14. The multiple-phase switching circuit of claim 8, wherein the multiple-phase switching circuit is used with a data recovery system.

* * * * *